July 25, 1967  C. M. WALENCIAK  3,333,038
METHOD FOR WET PELLETIZING CARBON BLACK
Filed Jan. 18, 1965
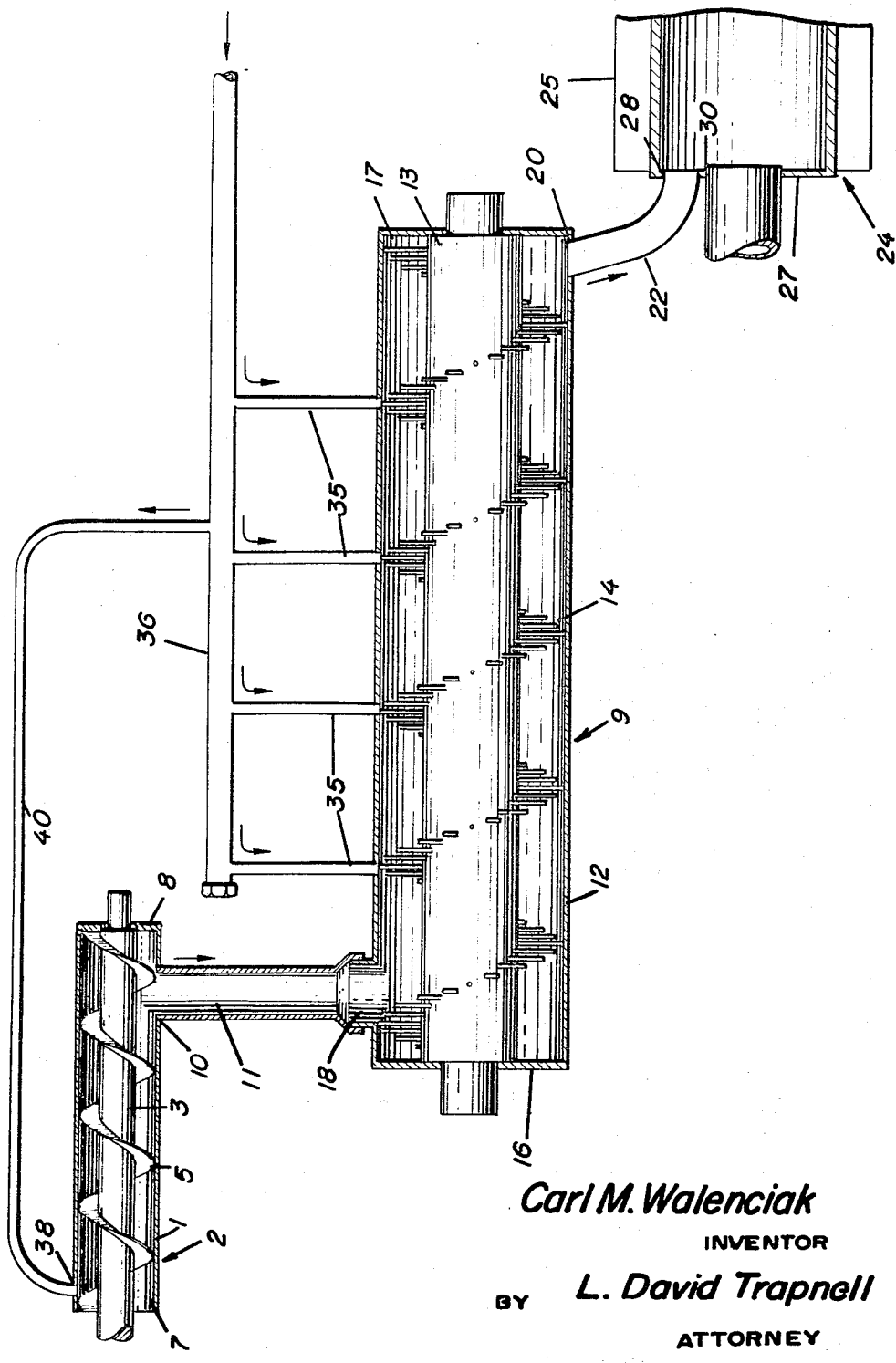
Carl M. Walenciak
INVENTOR
BY L. David Trapnell
ATTORNEY 3,333,038
METHOD FOR WET PELLETIZING CARBON BLACK
Carl M. Walenciak, Eunice, N. Mex., assignor to Continental Carbon Company, Houston, Tex., a corporation of Delaware
Filed Jan. 18, 1965, Ser. No. 426,157
3 Claims. (Cl. 264—117)

This invention relates to the manufacture of carbon black, and particularly carbon black which is produced in pelletized form.

In the present day manufacture of carbon black over 95% thereof is produced and sold in pelletized form, the remainder being marketed as dense, fluffy material. This is mainly because the pelletized product is of higher density, much cleaner and less dusty to handle, and can more easily be unloaded from bulk storage and transportation equipment.

In the pelletizing of carbon black two widely used methods are employed, as will be described immediately hereinafter.

(1) The older process wherein dry loose carbon black is agitated in the presence of seed pellets for relatively long periods of time (2 to 10 hours) until a dry pelletized product is formed. The agitation is usually accomplished in a continuous flow process by rolling the loose carbon black in a number of large volume rotating pelletizing drums that are supported on trunnions and rotated on their horizontal axis, the loose carbon black being continuously fed into one end of the rotating drum while the dry pellets continuously flow from the other end thereof.

(2) The newer pelletizing method wherein loose carbon black is mixed with 30% to 50% water and then agitated for relatively short periods of time (1 to 15 minutes) to form wet pellets, the agitation usually being accomplished in a continuous flow pattern by a pin-shaft type agitator rotating within a cylindrical chamber. The cylindrical chamber is stationary, of relatively small volume, and more or less horizontally disposed. Loose carbon black and water are separately fed to the inlet end of the cylindrical chamber or pelletizing box, and the wet pellets are continuously discharged from the discharge end (normally by gravity) into a rotating, drying drum.

Of the above two aforementioned pelletizing methods, over 75% of commercial carbon black is now being pelletized by the wet method. This method is preferred because the product has a more uniform, durable pellet that is less dusty and that ships and unloads more easily from bulk storage and shipping equipment.

In spite of the fact that the conventional wet pelletizing process is a great improvement over the older dry pelletizing method, it is far from perfect. When conventional wet pelletizing is used to pelletize tread grade black such as HAF (High Abrasion Furnace), ISAF (Intermediate Super Abrasion Furnace), and SAF (Super Abrasion Furnace), a fairly uniform spherical pellet varying mainly between $\frac{1}{32}''$ to $\frac{1}{16}''$ in diameter usually results. When the prior art wet pelletizing processes are used in carcass grade blacks, especially GPF (General Purpose Furnace) and SRF (Semi Reinforcing Furnace), a much more irregular pellet usually results. Such pellets are normally larger, more irregular in shape, have a much wider pellet size range, and are higher in overs and fines. The larger pellets and chunks are usually hard and do not disperse well in soft rubber mixes such as oil extended rubber and butyl rubber.

It is among the objects of the present invention to overcome the shortcomings of the prior art practices, and to provide an improved pelletizing method which will consistently produce from all grades of carbon black, a small spherical pellet of uniform size.

Another object is the attainment of the immediate foregoing and the provision of pelleted carbon black which is of such size and shape as to approximate the ideal size for the present needs of the rubber industry, i.e. 100% of the pellets will pass through a standard 18 mesh screen and be retained on a standard 35 mesh screen.

For further understanding of the invention, and additional objects and advantages thereof, reference will be had to the following description and accompanying drawing, and to the appended claims in which the various novel features are more particularly set forth:

In said drawing:

The single figure is a schematic layout of a form of apparatus which is constructed in accordance with the teachings of the present invention.

Referring more particularly to the drawing, the numeral 1 designates a cylindrical housing of preliminary mixing chamber 2 through which there extends an axially disposed and suitably journaled rotatable shaft 3 carrying a feed screw 5.

One end 7 of the cylindrical housing 1 is open to afford communication with a source of supply of loose carbon black; while the other end thereof is closed as shown at 8.

Adjacent its closed end 8, the bottom of the cylindrical housing 1 is provided with a discharge opening 10 which communicates with the upper end of gravity down leg 11.

Disposed below the closed end 8 of the cylindrical housing 1 is a cylindrical housing 12 which forms part of a pelletizing-mixing box 9. This pelletizing-mixing box may for present purposes be entirely conventional and comprise an axially extending rotatable shaft 13 with radially extending agitator pins 14.

Both ends of the cylindrical housing 12 of the pelletizing-mixing box 9, are closed, as shown at 16 and 17.

Adjacent its closed end 16 the housing 12 of the pelletizing-mixing box 9 is provided, on its upper surface, with an opening 18 which communicates with the lower end of the gravity down leg 11.

Adjacent its closed end 17 the pelletizing-mixing box 9 is provided, on its lower surface or underside, with an opening 20 which communicates with the upper end of a gravity chute 22.

A conventional rotatable drying drum 24 is disposed adjacent the lower end of the gravity chute 22, the same being provided with the circumferentially disposed means 25.

That end of the rotatable drying drum 24 which is most adjacent the closed end 17 of the pelletizing-mixing box 9 is provided with a closure or head 27 having an opening 28 for receiving the lower end of the gravity chute 22 and an opening 30 for receiving the conduit for exhausting the drying drum gases.

The housing 12 of the pelletizing-mixing box 9 is provided along its upper surface with a series of water ports 35 which communicate, through a water line 36, with a suitable water supply.

According to the teachings of the present invention the cylindrical housing 1 is provided adjacent its inlet end 7 with a water port 38, the latter communicating, through a water line 40, with the aforementioned water line 36. The total water in an amount from about 30% to 50% by weight of the carbon black conventionally required in the wet pelletizing process is divided for purposes of introduction into the carbon black between chamber 2 and pelletizing-mixing box 9. In this manner from approximately 5% to approximately 50% of the total wet-pelletizing water is premixed with the loose carbon black while it is within the cylindrical housing 1 and before it is fed into the pelletizing-mixing box 9. Preferably the range of total pelletizing water which is premixed with the loose carbon black is from 25% to 33%.

While the illustrative embodiment of the present invention contemplates the introduction of the premixing water into the loose carbon black passing through the cylindrical housing 1 of preliminary mixing chamber 2 with its screw conveyor 5, a modification comprises the substitution therefor of a shaft mounted pin-type agitator, in lieu of the shaft 3 carrying feed screw 5, in essence providing a preliminary pelletizing-mixing box with pin-type agitator turning at much slower speed than shaft 13 (i.e. 50 to 150 r.p.m. compared to speeds in excess of 300 r.p.m.) wherein the water is premixed.

It has been found that the second pass mixing box polishing stages of the older design mixing boxes form an excellent premixing stage to obtain good uniform mixing of the loose carbon black with the premix pelletizing water.

According to the foregoing construction and arrangement of elements, and method of operating the same, there is obtained:

Smaller average pellet size
Narrower pellet size distribution
More spherical pellets
Less fines and overs These improvements of the carbon black pellets were achieved by this process and are based on comparison of results of actual test runs under similar and comparable conditions, except for the inventive features of the present disclosure, producing pellets in a conventional operation and the invention hereof.

The exact scientific explanation of these phenomena is not understood at this time. However, it is theorized that the premix water forms very small uniform seed pellets mixed with loose carbon black that is then fed to the main mixing box pelletizing stage; and the small seed pellets form cores around which the remaining loose carbon black rolls to form the desired uniform small pellets.

Automatic ratio flow control equipment (not shown) may be used in water lines 36 and 40 to automatically control the ratio of flow of the premix water to the water port 38 and the pelletizing water to the water ports 35 in he housing 12 of the pelletizing-mixing box 9. Also a weighing belt or other carbon black metering device may be used, in which case the flow of water to the water ports 35 and 38 can be proportioned according to the flow of loose carbon black into the cylindrical housing 1 which forms the preliminary mixing chamber 2.

While I have shown and described certain specific embodiments of the present invention, it will be readily understood by those skilled in the art that I do not wish to be limited exactly thereto, since various modifications may be made without departing from the scope of the invention as defined in the appended claims.

I claim:

1. The method of pelletizing carbon black which includes introducing carbon black and a portion of the total water required to pelletize said black into a preliminary mixing chamber; moving flocculent carbon and water through said chamber while imparting agitational movement thereto; transferring said moistened and agitated carbon black to a wet pelletizing-mixing box; introducing the remainder of said water required to pelletize said black into said box; moving the moistened and agitated carbon black through said wet pelletizing-mixing box; and removing the wet pellets from said wet pelletizing-mixing box preparatory to drying the same.

2. The method of claim 1 wherein the total water required to pelletize said carbon black is divided between said preliminary mixing chamber and said pelletizing-mixing box with 5% to 50% of said water being introduced into said chamber, and 95% to 50% of said water being introduced into said box.

3. The method of claim 1 wherein the total water required to pelletize said carbon black is divided between said preliminary mixing chamber and said pelletizing-mixing box with 25% to 33% of said water being introduced into said chamber, and 75% to 66% of said water being introduced into said box.

References Cited
UNITED STATES PATENTS

| | | | |
|---|---|---|---|
| 2,131,686 | 9/1938 | Heller et al. | 23—314 |
| 3,005,725 | 10/1961 | Daniell | 264—117 |
| 3,071,803 | 1/1963 | Austin | 264—117 |

ROBERT F. WHITE, *Primary Examiner.*

J. R. HALL, *Assistant Examiner.*